US008645874B2

(12) United States Patent
Tremblay

(10) Patent No.: US 8,645,874 B2
(45) Date of Patent: Feb. 4, 2014

(54) MULTI-PAGE SORTING FOR MENU ITEMS ON A HANDHELD

(75) Inventor: Andrew Tremblay, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/242,704

(22) Filed: Sep. 23, 2011

(65) Prior Publication Data

US 2012/0324383 A1 Dec. 20, 2012

Related U.S. Application Data

(60) Provisional application No. 61/496,935, filed on Jun. 14, 2011.

(51) Int. Cl.
*G06F 3/14* (2006.01)
(52) U.S. Cl.
USPC .......................................... 715/864; 715/866
(58) Field of Classification Search
USPC .................................................. 715/864, 866
See application file for complete search history.

(56) References Cited

U.S. PATENT DOCUMENTS

| | | | | |
|---|---|---|---|---|
| 2008/0189614 A1* | 8/2008 | Jeong et al. | .................... | 715/716 |
| 2010/0295789 A1* | 11/2010 | Shin et al. | ...................... | 345/168 |
| 2011/0022310 A1* | 1/2011 | Ishii et al. | ...................... | 701/208 |
| 2011/0061010 A1* | 3/2011 | Wasko | .......................... | 715/769 |
| 2011/0252346 A1* | 10/2011 | Chaudhri | ....................... | 715/765 |
| 2011/0271182 A1* | 11/2011 | Tsai et al. | ...................... | 715/702 |
| 2012/0084692 A1* | 4/2012 | Bae | ............................... | 715/769 |

* cited by examiner

*Primary Examiner* — Omar Abdul-Ali
(74) *Attorney, Agent, or Firm* — Nixon & Vanderhye P.C.

(57) ABSTRACT

For a user interface, sorts are performed not just on the items currently visible, but across multiple pages or parts of pages some of which may not be currently visible. In one exemplary illustrative non-limiting implementation, all pages are virtually joined in the same data storage "bucket." Sorts performed by the computer may thus be applied across multiple pages some of which are currently visible and some of which may not be. By sorting displayed information, the sort criteria can be applied across and maintained across multiple other pages. In this way, the user sees expected functionality on the page she is currently viewing, and the computer works behind the scenes to consistently sort other items currently hidden from view so that when the user selects those pages they will already have been similarly sorted in a coherent manner.

9 Claims, 10 Drawing Sheets

*Exemplary Illustrative Game Play Platform*

*Exemplary Illustrative Game Play Platform Block Diagram*

| Levels | PAGE 02/02 ⇧⇩ |

| 0021 | m |
| | MOoooooo |
| 0022 | stage01 |
| | hero |
| 0023 | Brimming |
| | XANDER |
| 0024 | test04 |
| | noadjmmm |

Sort: Size

FIG. 5

| Levels | PAGE 02/02 ⇧⇩ |

| 0021 | Dungeon |
| | NOAgeo0 |
| 0022 | TGKOGDAD |
| | Skitter |
| 0023 | test04 |
| | noadjmmm |
| 0024 | 788 |
| | LA |

Sort: Latest

FIG. 6

| Levels | PAGE 02/02 ⇧⇩ |

| 0021 | m<br>MOoooooo | |
| 0022 | stage01<br>hero | |
| 0023 | Brimming<br>XANDER | |
| 0024 | test04<br>noadjmmm | |

⇦ | Sort: Shuffle

FIG. 7

MULTI-PAGE SORTING FOR MENU ITEMS ON A HANDHELD

CROSS-REFERENCES TO RELATED APPLICATIONS

This application claims the benefit of priority from provisional application No. 61/496,935 filed Jun. 14, 2011, the contents of which are incorporated herein by reference.

STATEMENT REGARDING FEDERALLY SPONSORED RESEARCH OR DEVELOPMENT

N/A.

FIELD

The technology herein relates to user interfaces, and more particularly to menus and other displays on a handheld device. Still more particularly, the technology herein relates to efficient ways to dynamically sort and re-sort menu and other items for display by a handheld device using for example a touch screen.

BACKGROUND AND SUMMARY

In the past, handheld computer devices were often single-function or of relatively limited functionality. For example, many of us carried mobile telephones that performed a relatively limited number of functions built into the phone at time of manufacture. In addition to making phone calls, it was possible to bring up a contact list, a calendar and perhaps play a game or two. However, the functionality was generally not expandable.

Modern handheld devices are a different story. With the availability of high-bandwidth data communications over wireless networks, it has now become possible to download new functionality onto handheld devices at any time, long after the devices have been released into the field and are in the hands of consumers. Entire businesses are based on developing new handheld applications—software modules that can be downloaded wirelessly on demand into a handheld device to perform desired functions. Some users have downloaded literally hundreds of applications onto their handheld devices. Organizing all of these applications into selectable menus can be a challenge.

One way to organize menu items is manually. Many of us have used interfaces that allow us to move icons associated with different applications around on the user interface using a pointing device such as a mouse, a stylus or even a finger in contact with a touch screen. Some devices permit users to move such icons across pages and to bring up different pages depending on which applications are desired. For example, a first menu page could be used to contain the most important applications the user uses every day. A second page might be used to organize icons the user uses less frequently. Still a third page might contain icons the user evokes only occasionally. Manually organizing the icons or buttons on these different pages can work well when there is a relatively limited number of items to organize and keep track of. Manual operations become more challenging when the number of items increases.

One way to organize a larger number of items is to sort them according to sort criteria. Every time we bring home groceries we sort the items based on where they are to be stored. Items requiring refrigeration are placed into the refrigerator. Canned items may be sorted into one cupboard, and dry goods into another.

Computers are very good at automatically sorting data items based on information such as for example alphabetic name order, most recent, author, type or the like. Although algorithms computers use to sort data are generally well-known, applying such algorithms to user interface items can be a challenge. For example, the user may become frustrated if an item she was looking at on one menu page "disappears" as a result of the sort because it was moved to a different page. Therefore, further improvements are possible.

In one exemplary illustrative non-limiting implementation, items such as software objects are downloadable onto a handheld or other computing device. Such items are presented on menu pages for selection by the user. Depending on the number of items that are downloaded, it may be necessary or desirable to display such items on more than one menu page. The handheld is capable of sorting these downloaded items based on a variety of sort criteria such as for example most used, most recent, author, creation date, type, alphabetic name, etc.

In an exemplary illustrative non-limiting implementation, sorts are performed not just on the items currently visible, but across multiple pages or parts of pages some of which may not be currently visible. In one exemplary illustrative non-limiting implementation, all pages are virtually joined in the same data storage "bucket." Sorts performed by the computer may thus be applied across multiple pages some of which are currently visible and some of which may not be. By sorting displayed information, the sort criteria can be applied across and maintained across multiple other pages. In this way, the user sees expected functionality on the page she is currently viewing, and the computer works behind the scenes to consistently sort other items currently hidden from view so that when the user selects those pages they will already have been similarly sorted in a coherent manner.

In exemplary illustrative non-limiting implementations, the sort may be performed based on a variety of criteria such as for example, latest, size, name, level, author/creator or other criteria. In some exemplary implementations, a "shuffle" functionality may be provided to re-sort menu items based on random or pseudo-random criteria. When the user sorts the items presented on a given page, the system can automatically apply that same sorting criteria to a larger set of items that may be displayed on different pages so that the order across multiple pages (some of which may be hidden at any given time) is consistent. In this way, the user is more easily able to navigate across multiple pages and finds items in those multiple pages sorted in a consistent manner. Additionally, the user is dynamically able to re-sort the items at any time and the re-sorting will once again be applied consistently across multiple pages of items.

Other non-limiting features and advantages include:

The more data displayed at one time, the more precision may be needed to navigate and select it. Because we have multiple pages, we are going to sort all of that data—even data that is not currently visible.

Lists are divided into chunks for easier navigability.

Each sort will sort all entries.

When sorting, the user stays on a given page but the data could be changed. Sorting changes the data being displayed as well as data that is hidden, rather than simply sorting the data currently being displayed.

Sorting mechanism is not restricted to the current page.

Global sort that is not restricted to the current page.

Scrolling list is a combination of sorted data and paging as well as a slider.

The buttons scroll based on movement of the slider.

There can be a detailed description behind the button (e.g., rating, high score, etc.).

Selecting an item can activate the icon to start the application.

A scroll box can be used to scroll the buttons or other items.

The less data in in the list, the slower the interface will scroll from top to bottom based on user manipulation of the slider Scrolling can be performed on one page of data at a time.

The items can be presorted by the server before download in order to maximize efficiency on the handheld device. Thus, part of the sort can be performed on the server, and another part of the sort can be performed on the handheld device after download. In other implementations, all sorting is performed on the handheld device.

When an item is selected, the selection remains where it is on the screen. Thus, the buttons are recycled in order to ensure memory efficiency. The buttons can be static, and the data stored in association with the buttons can be changed. The data is populated dynamically as one scrolls through the list.

The list can be endless, constrained only by the memory resources available on the handheld device.

Scrolling speed may be determined by the length of the list. Button height×number of buttons determines a ratio of how many pixels on the slider do we need to represent in the window in order to make it to the bottom of the list. The ratio determines how fast the slider scrolls the list. Faster scrolling will result from more items on the list, slower scrolling will result from fewer items on the list.

The slider may be configured to provide sufficient resolution to allow the user to control it to reach a desired item on the list.

The touch screen resolution may be in pixel values. When the touch screen is touched, the output is thus typically in whole numbers. Accordingly, the slider is designed to move in at least one-pixel increments.

In one example implementation, the height of the button is 32 pixels, so the slider height should be divisible by 32. The amount of data to display on the buttons can also determine the size of the buttons, which determines the scrolling resolution.

Can be used for any type of data format to present to the user, for example friends list or any other collection of items. Any type of data that can be arranged could be used.

It is possible to give the user level information based on user information, e.g., data that is linked to the user identification.

Paging breaks up long lists into shorter, more navigable lists.

Random levels can be downloaded and used.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2-8A show example screen displays; and

DETAILED DESCRIPTION

Exemplary Handheld Platform

Figure 1A:
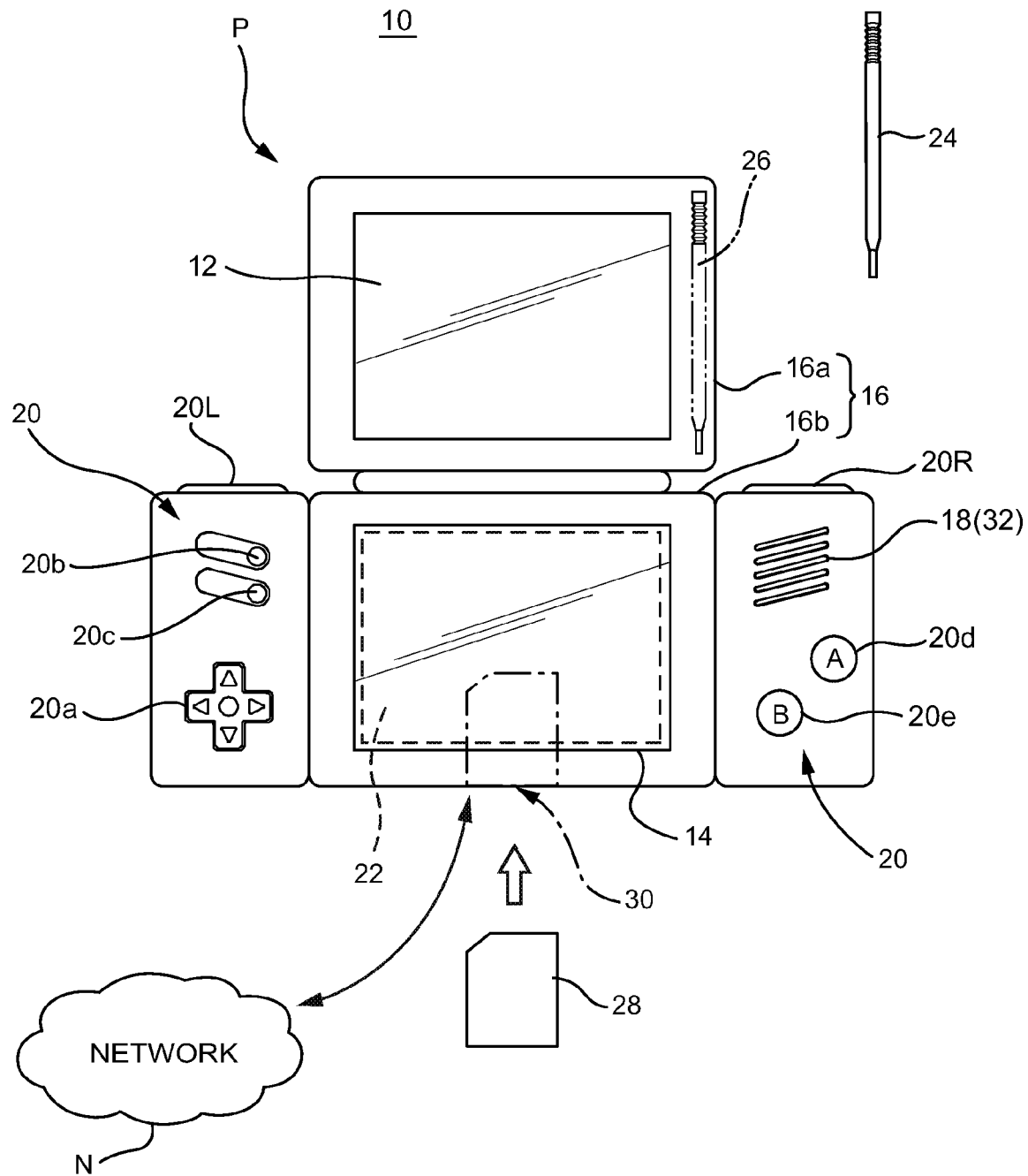
FIG. 1A is an exemplary external view of an exemplary illustrative non-limiting game apparatus for executing a game program.

In FIG. 1A, an exemplary illustrative non-limiting game apparatus 1 that can be used for implementing the virtual suction tool technique described above. In one exemplary illustrative non-limiting implementation, system 10 may comprise a Nintendo DS portable handheld videogame system including a 3D graphics generator capable of generating complex texture-mapped displays of characters interacting with a 3D world from any desired viewpoint.

In the exemplary non-limiting illustrative implementation shown, game device 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 1A. The operation switch section 14 also includes a direction indication switch (cross key) 14c, a start switch 14d, and a select switch 14e which are attached to one main surface of the side section of the lower housing 18a to the left of the second LCD 12 as seen in FIG. 1A. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 1A) of the second LCD 12, a touch panel 13 (surrounded by the dashed line in FIG. 1A) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole (an area represented by the two-dot chain line in FIG. 1A) is formed when necessary for accommodating the stylus 16 for operating the touch panel 13. In a part of one surface of the lower housing 18a, a cartridge insertion section (an area represented by the one-dot chain line in FIG. 1A) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18b inner to the cartridge insertion section has a built-in connecter (see FIG. 1B) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 1B:
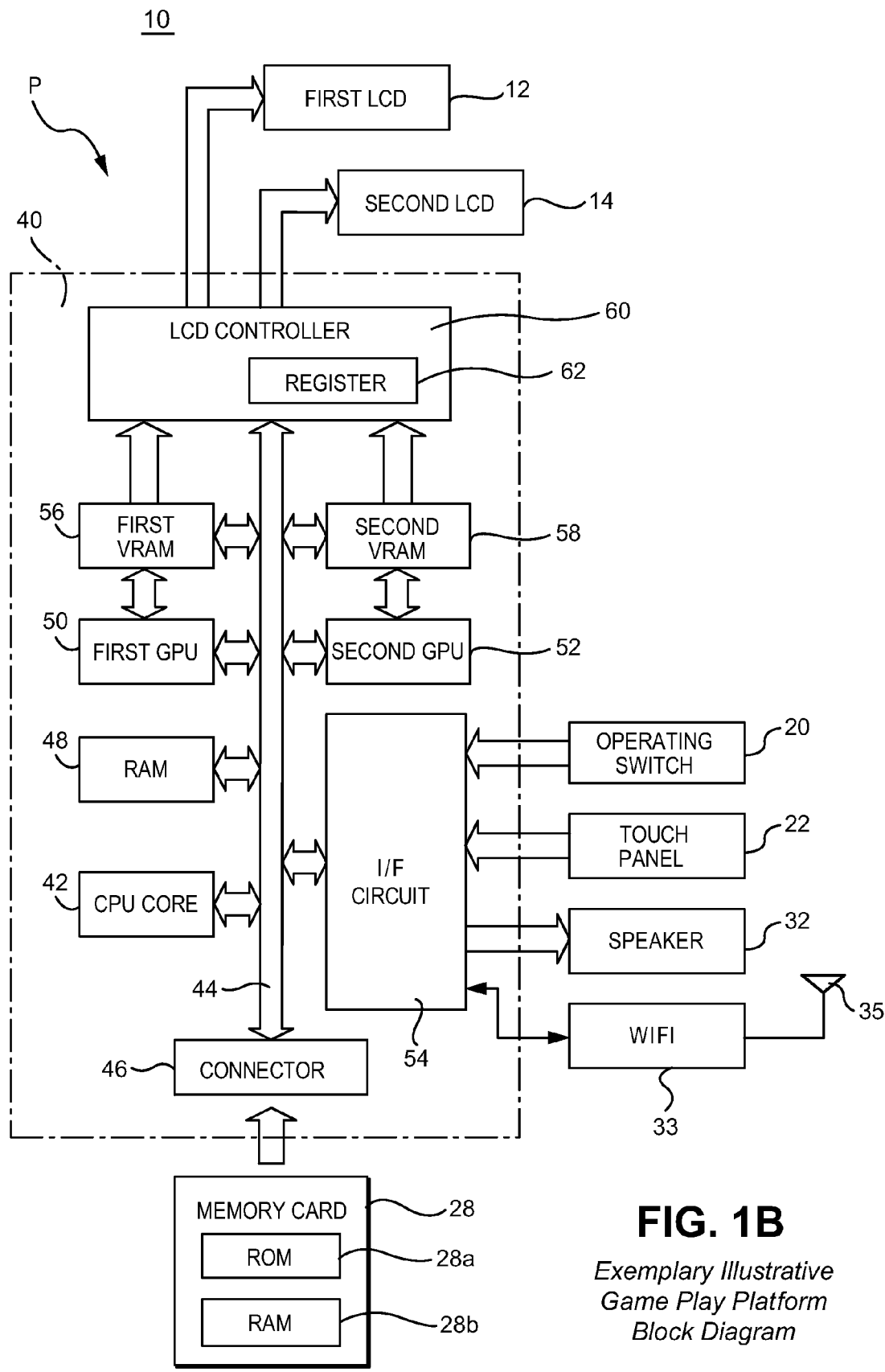
FIG. 1B is a block diagram showing an internal structure of the exemplary game apparatus.

Next, with reference to FIG. 1B, an internal structure of the game apparatus 1 will be described. FIG. 1B is a block diagram showing the internal structure of the game apparatus 1.

In FIG. 1B, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Figure 2:
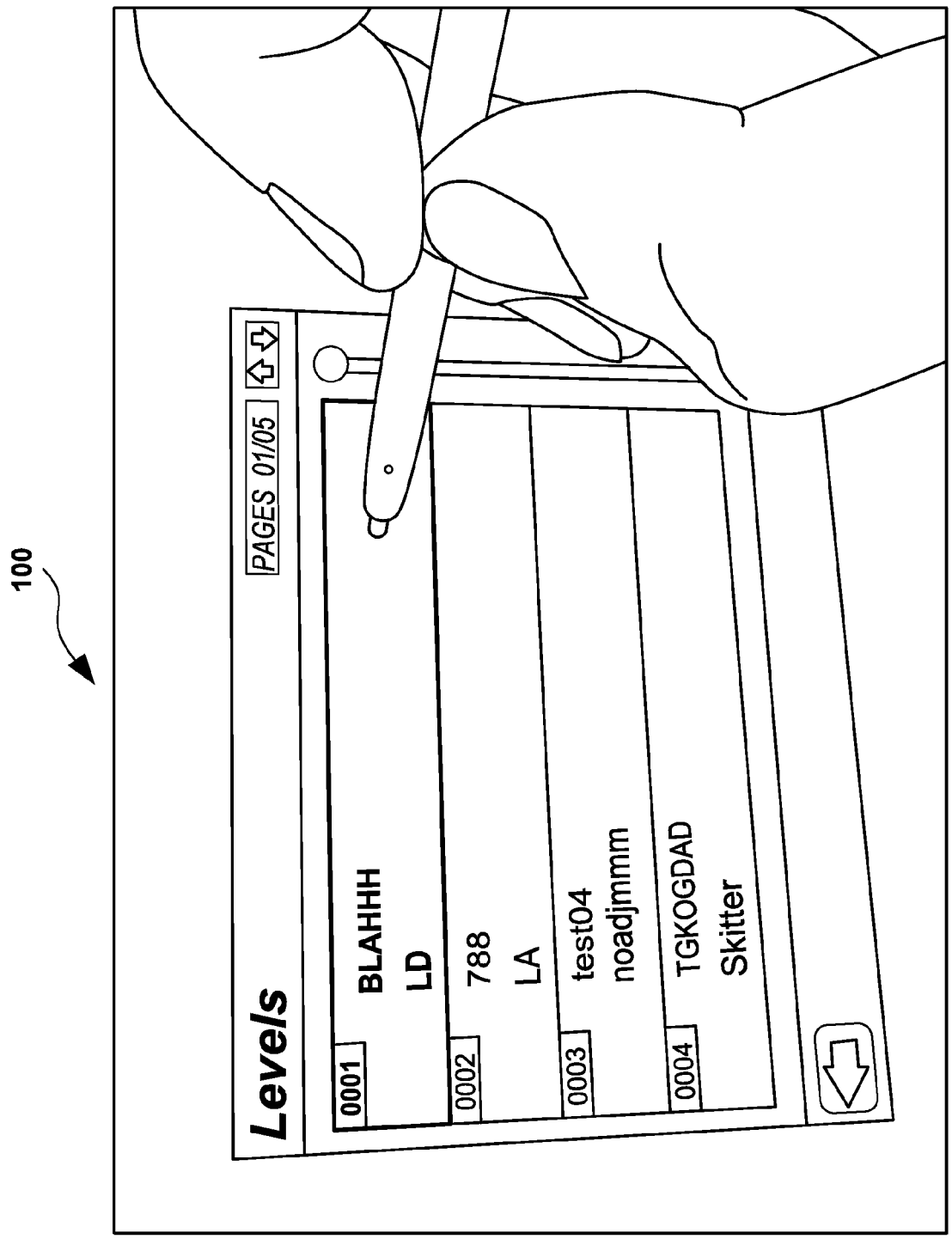
Figure 2A:
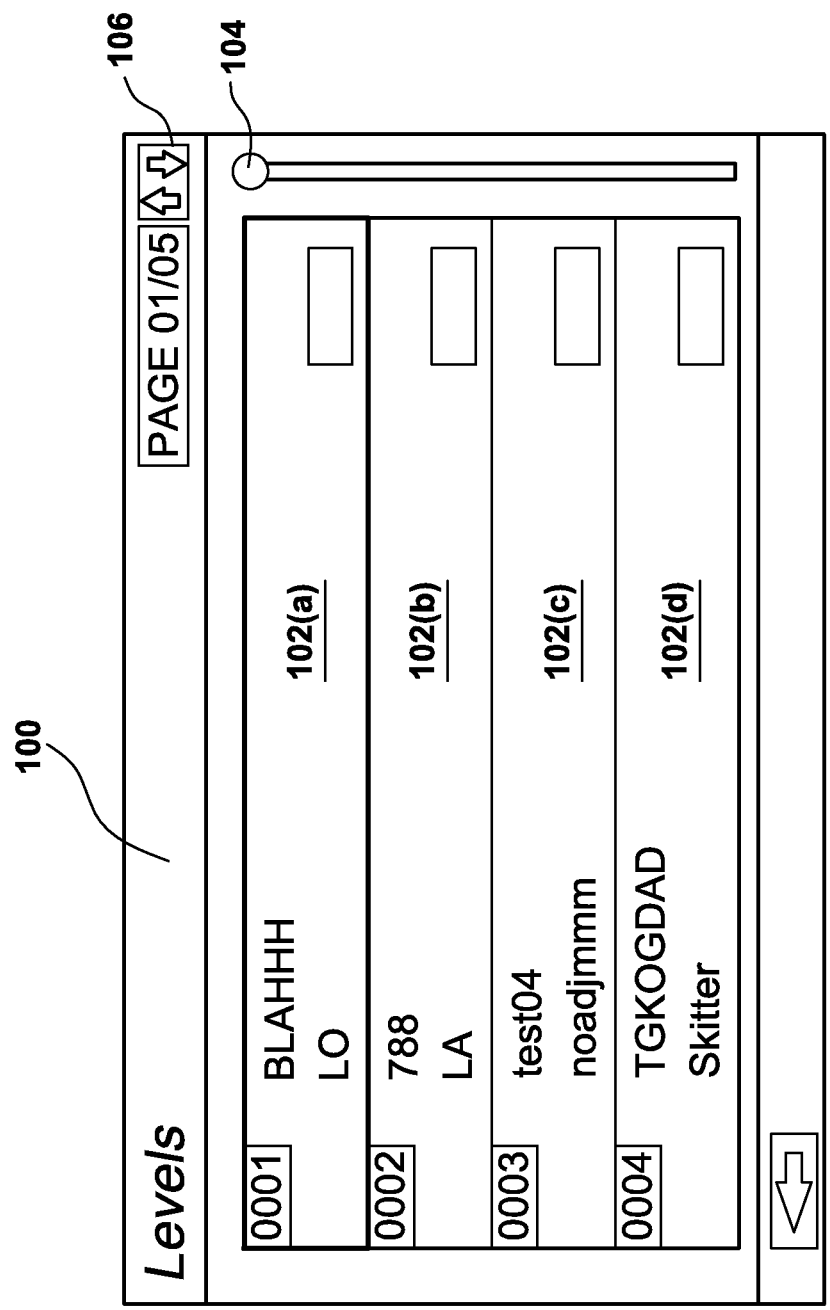

FIGS. 2 and 2A show an example user interface display format 100 for display on touch screen 14, 22. Display format 100 includes a number (in this case four) selectable items 102. These items 102 are selectable (as shown in FIG. 2) by moving a pointing device (e.g., a stylus, a finger, etc.) in contact with an area of touch screen 14, 22 that displays the item. Selection of the item may highlight the item visually (as shown in FIG. 2) and may also control actuation of a corresponding application or function (in this case, a level of game play).

A slider 104 is displayed on the right-hand side of format 100. Moving the slider 104 vertically causes the items displayed to scroll vertically, thus exposing new items to display and hiding other items from display. In other examples, scrolling could be performed horizontally, diagonally, etc. or there could be a fixed number of items displayed on each page without any scrolling capability. A page select button 106 allows paging from a previous page to a next page.

Figure 3:
Figure 4:

In one example implementation, It is possible to activate a sort function by using the touch screen to select different sort criteria. Sorting can be performed based for example on creator or author (FIG. 3), Level (FIG. 4), Size (FIG. 5), Latest (FIG. 6), or Shuffle (FIG. 7). When sorting by creator, the items may be displayed in an order corresponding to ascending or descending alphabetic name of the author of the item. Sorting by level can sort based on the name of the item or associated application. Sorting by size can reorder the displayed list based on smallest to largest or largest to smallest. Sorting by Latest can reorder the displayed list based on most recent to oldest or vice versa. Shuffle sort can reorder the list into a random order.

Figure 8:
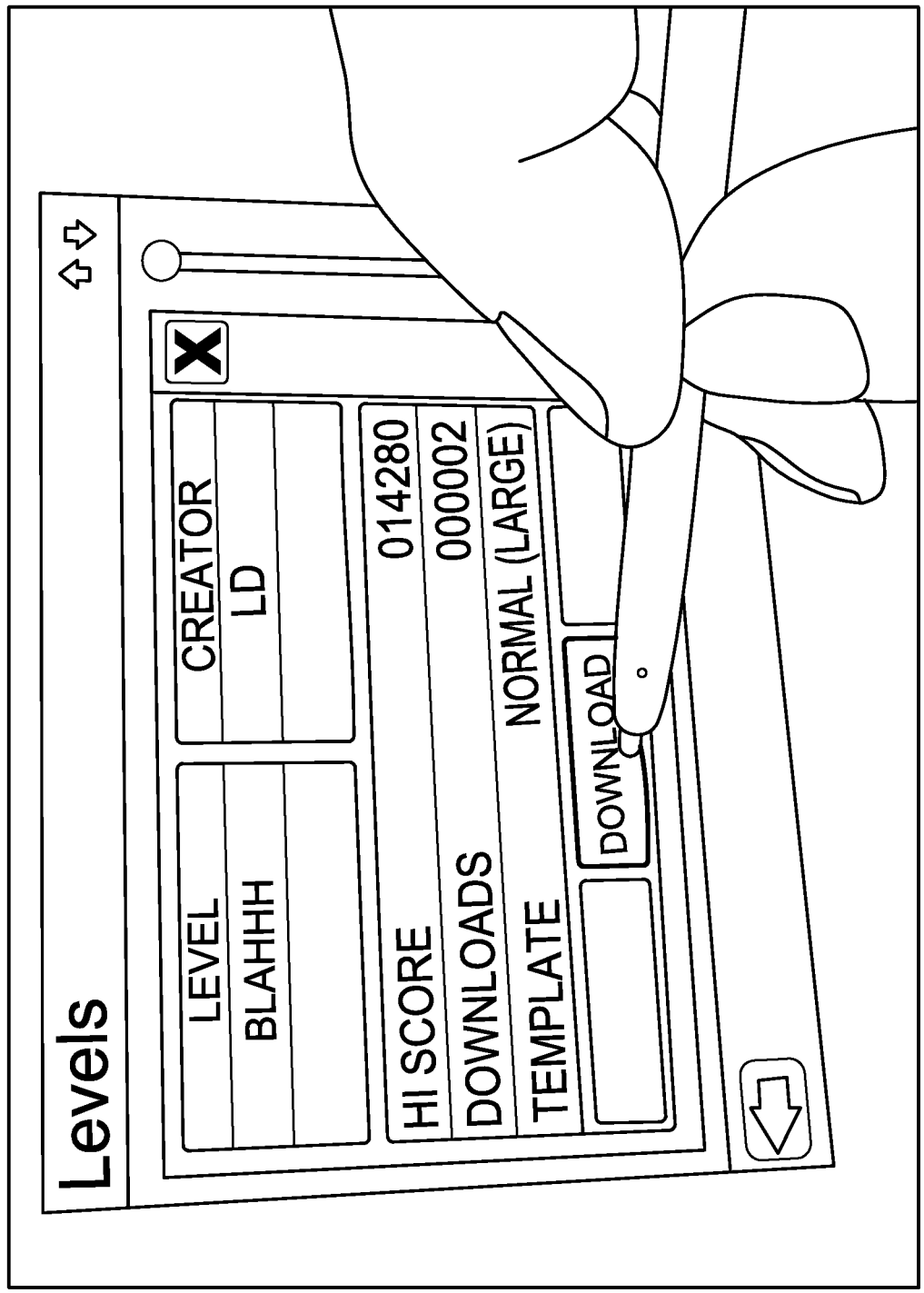
Figure 8A:
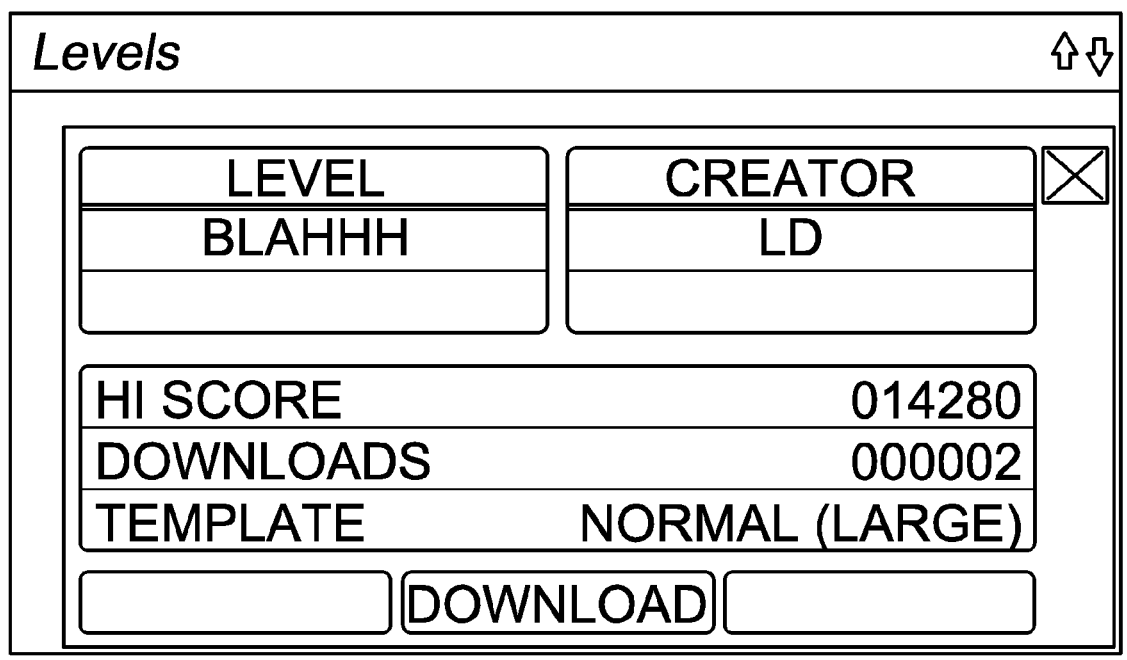

FIG. 8 shows network coordination functions that allow users to request additional items to be downloaded (e.g., by depressing the center button with a stylus on the touchscreen). FIGS. 8 and 8A also show example data that can be associated with an example item, the data including for example Level, Creator, Hi Score, Downloads, Template type, Rating, etc. A user can display this information from a server before requesting the item to be downloaded.

Figure 9:
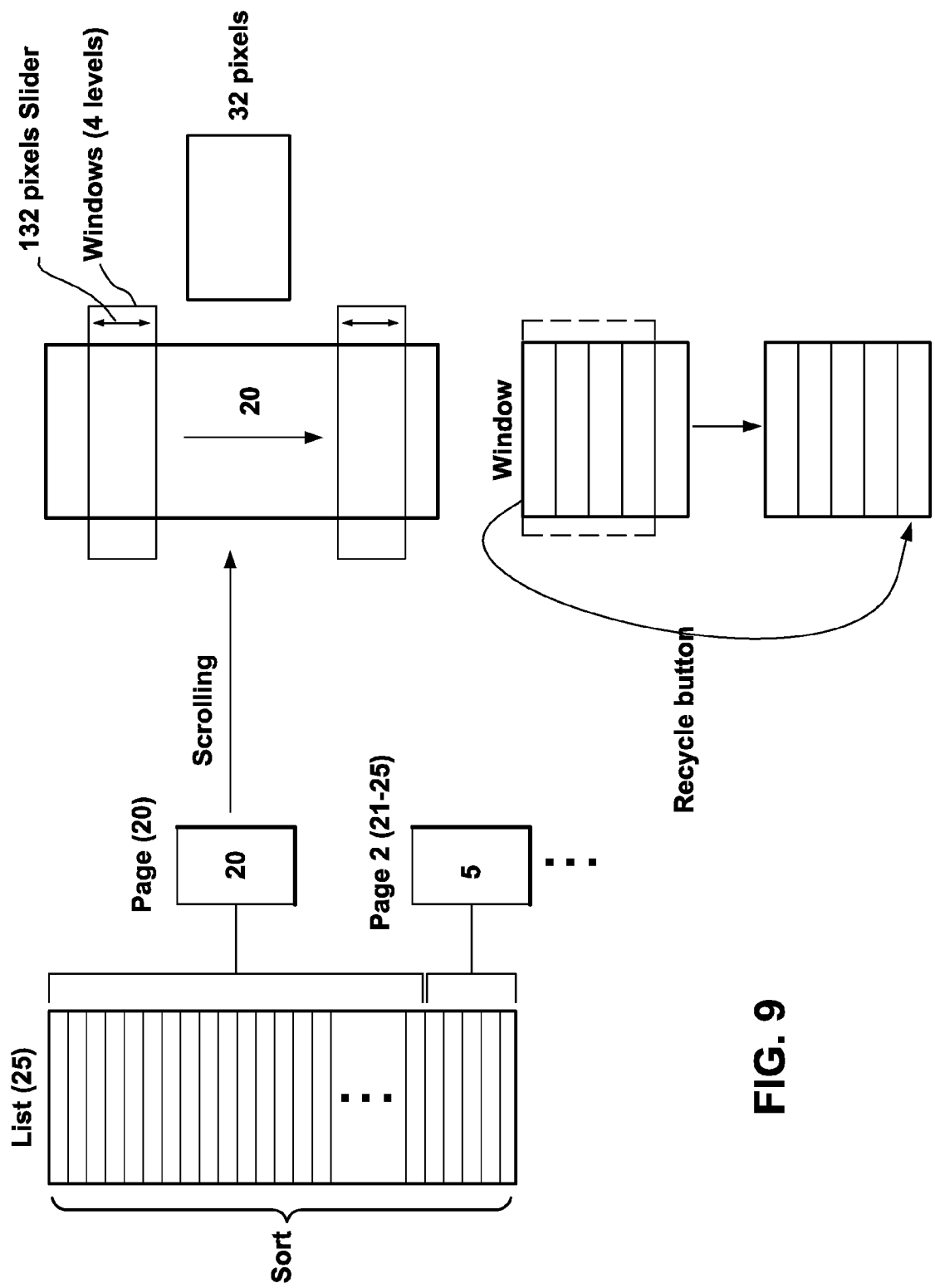
FIG. 9 shows example non-limiting data structures.

FIG. 9 shows a block diagram of data structures and sorting operations performed by system 100 in one exemplary illustrative non-limiting implementation. The upper left-hand corner of the drawing shows a list or array of menu items—in this case more items than can be displayed on a single menu page. The list can be any number of items—in this particular example for illustration purposes there are only 25 items in the list. In this particular non-limiting example, the first 20 of those items are displayed on a first page or menu display, and the next or remaining (e.g., 5) items on the list are displayed on a second page. As the diagram shows, the sort is applied across the entire list. Thus, the items displayed on the first page are sorted along with the items to be displayed on the second page irrespective of which page is currently being displayed. Sorting of the array into a different order may cause different items to be displayed on the currently displayed page. In this way, the user will see a sort of the items on the page currently being displayed, but will also find that the page(s) not currently being displayed will also be sorted in a coherent manner so that switching to that additional page(s) does not duplicate entries and also provides a consistent sorting across multiple pages. The pages become independent of the data that is displayed on the pages, and thus the items in the page become changeable representations of items in an array with a changeable order based on a variable sort.

In one exemplary illustrative non-limiting implementation, items are displayed on pages in a way that does not necessarily make all items visible at the same time. For example, the user may in some non-limiting implementations scroll the currently displayed page to bring into view items that are part of the page but cannot currently be seen. See "scrolling" indication on the drawing. In the exemplary illustrative non-limiting implementation, the sort applies not merely to the items that are currently visible on the current page, but also to items that are not currently visible on the current page and/or on other pages.

In one exemplary illustrative non-limiting implementation, scrolling is performed using a slider displayed vertically on the side of the page. In this non-limiting implementation, for purposes of illustration, up to 20 items may be organized as part of the current page whereas some smaller number (e.g., 4) items are currently visible. The slider scrolls a movable current window on the current page image to bring into view a subset of the items (e.g., each 32 pixels high or other convenient size) organized as part of the page. Other arrangements are possible. In some exemplary arrangements, all items on the current page are always displayed and visible at the same time. In other exemplary illustrative non-limiting implementations, scrolling or the like may be accomplished using any type of pointing device such as a stylus, a finger in contact with a touch screen, or any other desired implementation. The window will move a certain amount in response to the slider based on the number of items that are part of the page.

As the drawing shows, the slidable scrollable window may be arranged so that scrolling is performed in a circular manner. See bottom right-hand corner of the drawing. A "recycle" button may be used to perform this function.

While the technology herein has been described in connection with exemplary illustrative non-limiting embodiments, the invention is not to be limited by the disclosure. For example, each item could be represented by a graphical picture such as an icon or thumbnail. The invention is intended to be defined by the claims and to cover all corresponding and equivalent arrangements whether or not specifically disclosed herein.

I claim:

1. A computer-controlled method of presenting a user interface comprising:

using a processor, organizing plural items into multiple pages;

using the processor, providing a paging mechanism to receive user input for selection between said multiple pages for display;

using the processor in response to the selection, displaying at least one of said multiple pages;

using the processor, accepting input from the user to invoke a sorting function to sort items on the currently-displayed at least one page based on a user-specified sorting criterion; and in response to invocation of the sorting function, using the processor to automatically globally sort the plural items organized into multiple pages into a different order across ones of the multiple pages not currently displayed without requiring display thereof so that when the user invokes sorting, the processor automatically globally applies the same sorting criteria to items on displayed and non-displayed pages to provide a consistent order of items across displayed and non-displayed pages.

2. The method of claim 1 further including allowing a user to scroll items within a page.

3. The method of claim 1 wherein the sorting function provides variable sorting criteria.

4. A computer-controlled system for presenting a user interface comprising:

a data structure configured to organizing plural items into multiple pages;

a touch screen display, said data structure providing a paging mechanism to allow a user to select, using the touch screen display, between plural pages, said touch screen display currently displaying the selected one of said plural pages;

a processor coupled to said touch screen display, said processor allowing the user to invoke a sorting function and in response to invocation of the sorting function, globally sorting the plural items into a different order across the multiple pages such that at least one item is automatically shifted to one of the multiple pages that is not currently displayed without requiring display thereof so that when the user invokes sorting, the processor automatically globally applies the same sorting criteria to items on displayed and non-displayed pages to provide a consistent order of items across displayed and non-displayed pages.

5. The system of claim 4 further including allowing a user to scroll items within a page.

6. The system of claim 4 wherein the sorting function provides variable sorting criteria.

7. A non-transitory storage medium for storing instructions to control presentation of a user interface on a touch screen display, the storage medium storing:

a data structure configured to organizing plural items into multiple pages;

first instructions allowing a user to select, using the touch screen display, between plural pages, said touch screen display displaying one of said plural pages;

second instructions allowing the user to invoke a sorting function and in response to invocation of the sorting function, and globally sorting the plural items into a different order across displayed pages and pages other than one displayed such that at least one item is automatically shifted to one of the multiple pages that is not currently displayed without requiring display thereof so that when the user invokes sorting, the second instructions automatically globally applying the same sorting criteria to items across displayed and non-displayed pages to provide a consistent order of items across displayed and non-displayed pages.

8. The storage medium of claim 7 further including allowing a user to scroll items within a page.

9. The storage medium of claim 7 wherein the sorting function provides variable sorting criteria.

* * * * *